(12) United States Patent
Wu et al.

(10) Patent No.: US 9,915,571 B2
(45) Date of Patent: Mar. 13, 2018

(54) TEMPERATURE MEASUREMENT AND CALIBRATION CIRCUIT, PASSIVE RADIO FREQUENCY IDENTIFICATION TAG AND METHOD FOR MEASURING TEMPERATURE

(71) Applicants: EXCELIO TECHNOLOGY (SHENZHEN) CO., LTD., Shenzhen (Guangdong Province) (CN); WUXI EXCEL TECHNOLOGY CO., LTD., Wuxi (Jiangsu Province) (CN)

(72) Inventors: Patrick Bian Wu, Shenzhen (CN); Xingyi Wang, Shenzhen (CN); Lingli Zhou, Shenzhen (CN); Fuqiang Han, Shenzhen (CN); Shehu Qi, Shenzhen (CN); Yuanming Luo, Shenzhen (CN)

( * ) Notice: Subject to any disclaimer, the term of this patent is extended or adjusted under 35 U.S.C. 154(b) by 393 days.

(21) Appl. No.: 14/661,004

(22) Filed: Mar. 18, 2015

(65) Prior Publication Data

US 2015/0268103 A1   Sep. 24, 2015

Related U.S. Application Data

(63) Continuation-in-part of application No. PCT/CN2013/073895, filed on Apr. 8, 2013.

(30) Foreign Application Priority Data

Sep. 20, 2012   (CN) .......................... 2012 1 0352087

(51) Int. Cl.
 *G01K 15/00* (2006.01)
 *G06K 19/07* (2006.01)
 *G01K 1/02* (2006.01)
(52) U.S. Cl.
 CPC ........... *G01K 15/005* (2013.01); *G01K 1/024* (2013.01); *G06K 19/0717* (2013.01)
(58) Field of Classification Search
 None
 See application file for complete search history.

(56) References Cited

U.S. PATENT DOCUMENTS 4,165,642 A * 8/1979 Lipp ...................... G01K 1/028
                                                                         257/E27.031
8,140,293 B2 * 3/2012 Jeong ..................... G01K 7/425
                                                                         702/117

* cited by examiner

*Primary Examiner* — An Do
*Assistant Examiner* — Renee I Wilson
(74) *Attorney, Agent, or Firm* — Wayne & Ken, LLC; Tony Hom (57) ABSTRACT

The present invention relates to the field of radio frequency identification, in particular to a temperature measurement and calibration circuit and a passive radio frequency identification tag. Meanwhile, the present invention further relates to a method for performing temperature measurement by using the tag. The temperature measurement and calibration circuit of the tag generates an upper reference voltage value limit and a lower reference voltage value limit, which do not change with temperature, then calibrates the upper reference voltage value limit and the lower reference voltage value limit to a uniform upper voltage value limit and a uniform lower voltage value limit, and eliminates the problem of different reference voltages of tags due to the power supply voltage fluctuation and process deviation. Meanwhile, a temperature measurement voltage generator circuit of the tag generates a calibration voltage value under a uniform calibration temperature. After the calibration voltage value is subjected to translational calibration, the calibration voltage values of the tags to be measured are equal, so that the consistency of temperature values of different tags is ensured. The circuit and tag provided by the present invention may be widely applied to ambient temperature detection, animal temperature detection, cold chain temperature detection or other fields, and have high accuracy of measurement.

9 Claims, 6 Drawing Sheets

TEMPERATURE MEASUREMENT AND CALIBRATION CIRCUIT, PASSIVE RADIO FREQUENCY IDENTIFICATION TAG AND METHOD FOR MEASURING TEMPERATURE

CROSS-REFERENCE TO RELATED APPLICATIONS

This application is a continuation-in-part of International Patent Application No. PCT/CN2013/073895 with an international filing date of Apr. 8, 2013, designating the United States, and further claims priority benefits to Chinese Patent Application No. 201210352087.X filed Sep. 20, 2012. The contents of all of the aforementioned applications, including any intervening amendments thereto, are incorporated herein by reference.

TECHNICAL FIELD

The present invention relates to the field of radio frequency identification, in particular to a temperature measurement and calibration circuit and a passive radio frequency identification tag. Meanwhile, the present invention further relates to a method for performing temperature measurement by using the passive radio frequency identification tag.

BACKGROUND OF THE PRESENT INVENTION

As a contactless automatic identification technology, Radio Frequency Identification (RFID), having a data transmission function with low power consumption, may be applied to logistics management, identity recognition, transportation, food and healthcare, animal management and many other fields. RFID tag systems are mainly divided into two types: passive RFID tags, i.e., RFID tags not to be powered by a power supply; and active RFID tags, i.e., RFID tags to be powered by a power supply. When a passive RFID tag operates, the energy required for its operating circuit is converted from the energy of an electromagnetic field. Due to their low cost, high level of integration, flexible packaging, long service life and the like, passive tag systems are particularly suitable for warehouse management, food and healthcare, animal management or other fields.

Temperature sensors have been widely applied to the fields of industrial control, healthcare and measurement. In an integrated electronic system, the temperature sensors generally exist in two forms:

One form is that temperature sensors are independent from an integrated circuit, that is, there are temperature sensor chips independent from the integrated electronic system. For example, the integrated electronic system measures temperature by an external thermistor. In an integrated electronic system, such individual temperature sensor chips have the characteristics of high cost, large packaging volume and the like. As a result, the application fields of such temperature sensors are limited. For example, such temperature sensors are unable to perform temperature measurement well in warehouse management, food and healthcare, animal management or other fields.

The other form is that a chip having a temperature measurement function is built-in an integrated electronic system. At present, the temperature measurement technology with built-in chips has been widely applied to integrated electronic systems. For this technology, in the case that there is a power supply available, a physical quantity (e.g., current) in direct proportion to the absolute temperature is obtained in such a way that a bandgap reference voltage is generated by acquiring a difference in voltage between PN junctions of a semiconductor chip. If a chip having a temperature measurement function is built-in a passive RFID tag, a passive RFID tag having the temperature measurement function may be obtained. After the temperature collection and measurement is performed by using the passive RFID tag, a physical quantity indicative of temperature is obtained. As the physical quantity is usually an analog signal, the passive RFID tag usually performs analog-to-digital conversion on the physical quantity, i.e., converts the physical quantity into a digital code in certain accuracy. For example, the passive RFID tag converts an analog quantity indicative of a change in temperature of 1° C. into a 10-bit binary digital code, where the change in temperature indicated by each bit of digital code is less than 0.001° C.

Specifically, during temperature measurement, a passive RFID tag needs to absorb energy from a surrounding electromagnetic field first, where the energy is specifically embodied in AC on an inductive coil; and then, the passive RFID tag converts the absorbed energy, i.e., from AC to DC, by an analog front-end receiving circuit, so as to obtain a DC power supply voltage for the operation of the whole passive RFID tag. During the temperature measurement performed by using a passive RFID tag, on one hand, as each module of the passive RFID tag is limited in restraining the AC disturbance to the power supply voltage, the node voltage of each module will be modulated by the disturbed power supply voltage to varying degrees, and such modulation disturbance, in the nature of noise, will impede the accuracy of temperature measurement performed by using the passive RFID tag; and on the other hand, during the manufacturing of a passive RFID tag by a semiconductor chip manufacturer, as the manufactured RFID tag is subjected to the processes, the performance of the circuits will be fluctuated to varying degrees. Such fluctuation directly results in a large range of errors and inconsistency, in converting a physical quantity indicative of temperature, of different RFID tags manufactured by a same semiconductor chip manufacturing process. In other words, it is likely to obtain different digital codes when a same temperature is measured by using different RFID tags. That is, different values of temperature will be obtained when a same temperature is measured by using different RFID tags. Thus, it is unable to ensure the consistency of temperature measurement of passive RFID tags. For batch products, this is a fatal weakness which directly affects whether or not the products may be introduced to the market and accepted by users eventually.

SUMMARY OF THE PRESENT INVENTION

A technical problem to be solved by embodiments of the present invention is to provide a temperature measurement and calibration circuit, a passive radio frequency identification tag and a method for performing temperature measurement by using the tag, which may solve the problem that it is unable to ensure the temperature consistency, during temperature measurement performed by using a passive radio frequency identification tag, due to the power supply voltage fluctuation or manufacturing process deviation of the passive radio frequency identification tag.

To achieve the above objective, the present invention employs the following technical solutions: a temperature measurement and calibration circuit is provided, including:

a reference voltage generator circuit, the input/output end of which is connected to an external detection device and the output ends of which are connected to a first amplifier circuit and a second amplifier circuit, respectively, configured to generate a first bandgap reference voltage signal, i.e., an upper reference voltage value limit, to the first amplifier circuit and a second bandgap reference voltage signal, i.e., a lower reference voltage value limit, to the second amplifier circuit, wherein the first bandgap reference voltage signal and the second bandgap reference voltage signal do not change with temperature or process parameters;

a temperature measurement voltage generator circuit, the output end of which is connected to the external detection device and a voltage translation regulator circuit, configured to generate a voltage value which linearly changes with temperature;

the voltage translation regulator circuit, the input end of which is connected to the external detection device and the temperature measurement voltage generator circuit, configured to translate the temperature measurement value to an amplifier circuit upon receiving a voltage translation regulation indication signal input from the external detection device;

three amplifier circuits, wherein both the first amplifier circuit and the second amplifier circuit are connected like a unity-grain buffer and configured to separately adjust and then output the upper reference voltage value limit and the lower reference voltage value limit to an analog-to-digital converter circuit, and the third amplifier circuit is connected in such a way that the grain amplification factor is adjustable and configured to amplify the temperature measurement voltage value, adjust the temperature measurement voltage value to be between the upper reference voltage value limit and the lower reference voltage value limit, and output the temperature measurement voltage value to the analog-to-digital converter circuit; and the analog-to-digital converter circuit, configured to convert the upper reference voltage value limit and the lower reference voltage value limit into digital signals and convert the temperature measurement voltage value between the upper reference voltage value limit and the lower reference voltage value limit into a digital signal, wherein the digital signal is indicative of the temperature.

Another objective of the embodiments of the present invention is to provide a passive radio frequency identification tag using the temperature measurement and calibration circuit as described above.

Still another objective of the embodiments of the present invention is to provide a method for performing temperature measurement by using the passive radio frequency identification tag as described above. This method includes two parts: calibration prior to measurement and temperature measurement;

the calibration prior to measurement includes the following steps:

a. generation and calibration of a reference voltage signal a reference voltage generator circuit of the tag generates an upper reference voltage value limit and a lower reference voltage value limit, which do not change with temperature; and after the upper reference voltage value limit and the lower reference voltage value limit are calibrated, the upper reference voltage value limit of all tags to be measured is calibrated to a uniform upper voltage value limit, and the lower reference voltage value limit thereof is also calibrated to a uniform lower voltage value limit, wherein the upper reference voltage value limit and the lower reference voltage value limit have the characteristic of not changing with temperature or process parameters;

b. generation of digital signals of the upper reference voltage value limit and the lower reference voltage value limit the upper reference voltage value limit is output to an analog-to-digital converter circuit through a first amplifier circuit to generate a digital signal indicative of a maximum value, and the lower reference voltage value limit is output to the analog-to-digital converter circuit through a second amplifier circuit to generate a digital signal indicative of a minimum value;

c. generation and calibration of a calibration temperature voltage value a temperature measurement voltage generator circuit of the tag generates a calibration voltage value under a uniform calibration temperature; and a voltage translation regulator circuit receives a control signal from an external detection device and then performs translational calibration on the calibration voltage values of all the tags so that the voltage values generated by the tags under the uniform calibration temperature are the same; and the temperature measurement includes the following steps:

d. generation and amplification of the temperature measurement voltage value the temperature measurement voltage generator circuit of the tag detects the temperature of an object to be measured and generates a voltage value; and the voltage value is amplified by an amplifier circuit to be between the upper reference voltage value limit and the lower reference voltage value limit and input to the analog-to-digital converter circuit;

e. extraction of a temperature value the analog-to-digital converter circuit converts the voltage value into a digital signal, so that the temperature value of the object to be measured may be obtained according to the digital signal.

The present invention has the following advantages: the reference voltage generator circuit of the radio frequency identification tag generates two paths of reference voltage signals, i.e., an upper reference voltage value limit and a lower reference voltage value limit, which do not change with temperature, then calibrates the upper reference voltage value limit and the lower reference voltage value limit so that the upper reference voltage value limit of all tags to be measured is calibrated to a uniform upper voltage value limit and the lower reference voltage value limit thereof is calibrated to a uniform lower voltage value limit, and eliminates the problem of different generated reference voltages of tags due to the fluctuation of various non-ideal factors and process deviation; meanwhile, the temperature measurement voltage generator circuit of each tag generates a calibration voltage value under a uniform calibration temperature, and after the calibration voltage value is subjected to translational calibration, the calibration voltage values of all tags to be measured are equal, so that the consistency of temperature values measured by using different tags under the fluctuation of various non-ideal factors and different process deviations is ensured. Further, by amplifying the temperature measurement voltage value generated during the actual measurement so that this temperature measurement voltage value is allowed to be between the upper reference voltage value limit and the lower reference voltage value limit and performing analog-to-digital conversion on this temperature measurement voltage value, and by performing equalization on the digital signal, an accurate temperature value corresponding to this voltage value may be obtained. In this way, the accuracy of temperature measurement is ensured. The circuit and tag provided by the present invention may be widely applied to ambient temperature detection, animal temperature detection, cold chain temperature detection or other fields, and have high accuracy of measurement.

BRIEF DESCRIPTION OF THE DRAWINGS

To describe the technical solutions in the embodiments of the present invention or in the prior art more clearly, drawings to be used in the description of the embodiments or of the prior art will be introduced briefly. Apparently, the drawings hereinafter merely show some embodiments of the present invention, and a person of ordinary skill in the art may obtain other drawings according to these drawings without any creative effort.

DETAILED DESCRIPTION OF THE PRESENT INVENTION

The technical solutions in the embodiments of the present invention will be clearly and completely described as below with reference to the drawings in the embodiments of the present invention. Apparently, the described embodiments are merely some but not all of embodiments of the present invention. All other embodiments obtained by a person of ordinary skill in the art on the basis of the embodiments of the present invention without any creative effort shall fall into the protection scope of the present invention.

Before describing the embodiments of the present invention, some keywords involved in the embodiments of the present invention are to be explained. "Coupled to" as used in the embodiments of the present invention means that two connecting endpoints are in direct or indirect connection.

Figure 1:
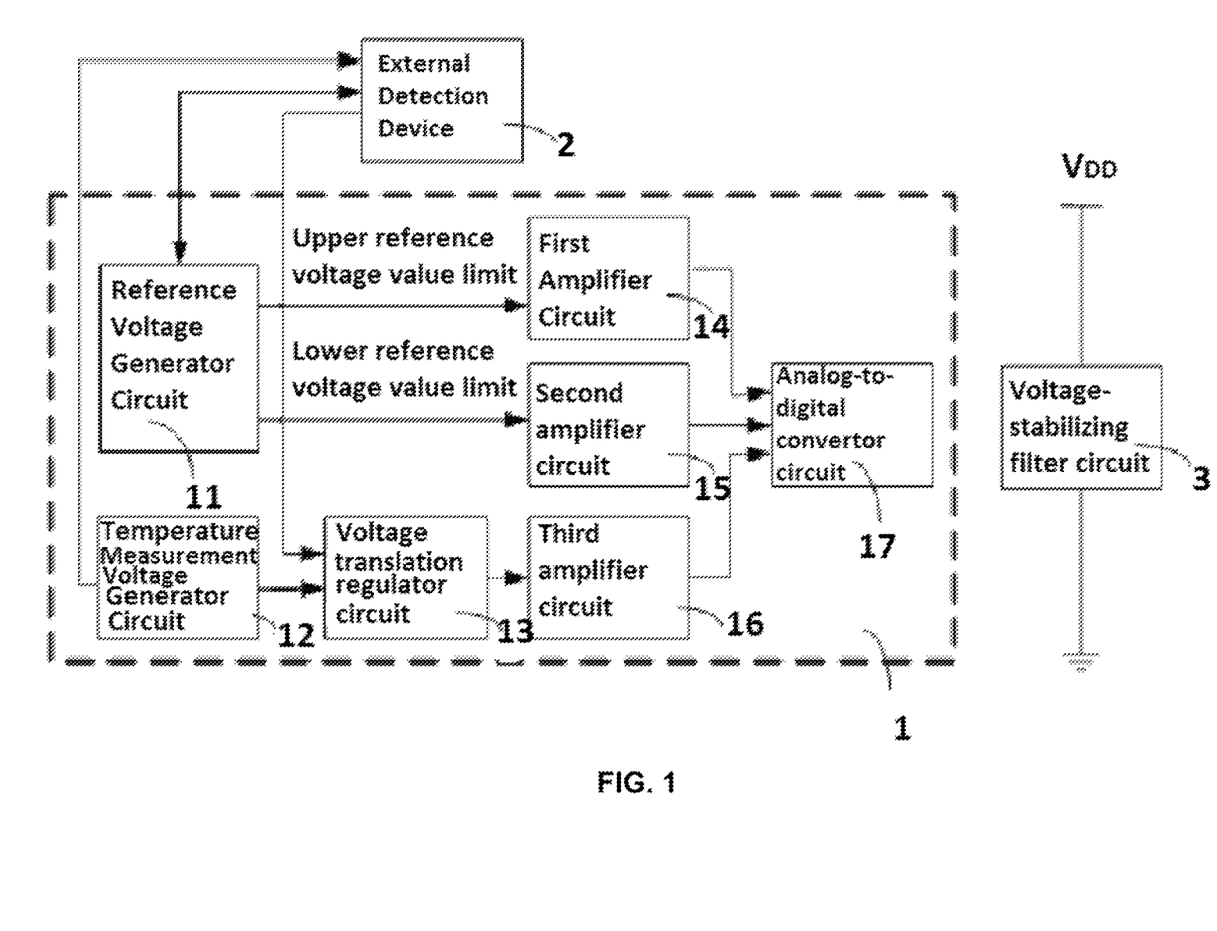
FIG. 1 is a general structure block diagram of a circuit according to the present invention.

As shown in FIG. 1, a general structure block diagram of a circuit according to the present invention is shown. The present invention provides a temperature measurement and calibration circuit 1, including:

a reference voltage generator circuit 11, the input/output end of which is connected to an external detection device 2 and the output ends of which are connected to a first amplifier circuit 14 and a second amplifier circuit 15, respectively, configured to generate a first bandgap reference voltage signal, i.e., an upper reference voltage value limit, to the first amplifier circuit 14 and a second bandgap reference voltage signal, i.e., a lower reference voltage value limit, to the second amplifier circuit 15, wherein the first bandgap reference voltage signal and the second bandgap reference voltage signal do not change with temperature, wherein the reference voltage generator circuit 11 simultaneously inputs the generated two paths of reference voltage into the external detection device 2, and then the external detection device 2 detects and calibrates the two paths of reference voltage; the calibration of the upper reference voltage value limit and the lower reference voltage value limit may be performed by a calibration circuit internally or externally connected to the reference voltage generator circuit 11; however, considering the problem of power supply voltage fluctuation or process deviation of the calibration circuit itself, the calibration structure employed by the present invention is preferably laser trimming, in other words, the reference voltage generator circuit 11 is connected to a laser trimming structure, and the laser-trimmed reference voltage has the characteristic of not changing with temperature or process parameters;

a temperature measurement voltage generator circuit 12, the output end of which is connected to the external detection device 2 and a voltage translation regulator circuit 13, configured to generate a voltage value which linearly changes with temperature;

the voltage translation regulator circuit 13, the input end of which is connected to the external detection device 2 and the temperature measurement voltage generator circuit 12, configured to translate the temperature measurement value to an amplifier circuit upon receiving a voltage translation regulation indication signal input from the external detection device 2;

three amplifier circuits, wherein both the first amplifier circuit 14 and the second amplifier circuit 15 are connected like a unity-grain buffer and configured to separately adjust and then output the upper reference voltage value limit and the lower reference voltage value limit to an analog-to-digital converter circuit 17, and the third amplifier circuit 16 is connected in such a way that the grain amplification factor is adjustable and configured to amplify the temperature measurement voltage value, adjust this temperature measurement voltage value to be between the upper reference voltage value limit and the lower reference voltage value limit, and output this temperature measurement voltage value to the analog-to-digital converter circuit 17; and the analog-to-digital converter circuit 17, configured to convert the upper reference voltage value limit and the lower reference voltage value limit into digital signals and convert the temperature measurement voltage value between the upper reference voltage value limit and the lower reference voltage value limit into a digital signal, wherein the digital signal is indicative of the temperature.

As a passive radio frequency identification tag converts external AC into DC for use of internal circuits, the operating stability of the passive radio frequency identification tag directly depends upon the stability of voltage. To eliminate this influence, on the accuracy of temperature measurement performed by using the tag, of the AC disturbance to the power supply voltage, a voltage-stabilizing filter circuit 3 is connected between a power supply of the temperature measurement and calibration circuit and a GND. Considering the cost and area of the whole tag, the voltage-stabilizing filter circuit 3 may be directly connected between the power supply and the GND via a capacitor.

The present invention may solve the problem of the existing similar products that it is unable to ensure the temperature consistency, during temperature measurement performed by using tags, due to the power supply voltage fluctuation or process deviation of the tags. The working principle is as follows: the reference voltage generator circuit of the radio frequency identification tag generates two paths of reference voltage signals, i.e., an upper reference voltage value limit and a lower reference voltage value limit, which do not change with temperature, then calibrates the upper reference voltage value limit and the lower reference voltage value limit so that the upper reference voltage value limit of all tags to be measured is calibrated to a uniform upper voltage value limit and the lower reference voltage value limit thereof is calibrated to a uniform lower voltage value limit, and eliminates the problem of different generated reference voltages of tags due to the fluctuation of various non-ideal factors and process deviation; meanwhile, the temperature measurement voltage generator circuit of each tag generates a calibration voltage value under a uniform calibration temperature, and after the calibration voltage value is subjected to translational calibration, the calibration voltage values of all tags to be measured are equal, so that the consistency of temperature values measured by using different tags under the fluctuation of various non-ideal factors and different process deviations is ensured. Further, by amplifying the temperature measurement voltage value generated during the actual measurement so that this temperature measurement voltage value is allowed to be between the upper reference voltage value limit and the lower reference voltage value limit and performing analog-to-digital conversion on this temperature measurement voltage value, and by performing equalization on the digital signal, an accurate temperature value corresponding to this voltage value may be obtained. In this way, the accuracy of temperature measurement is ensured.

The implementation of the present invention will be described as below in details by specific embodiments.

Figure 2:
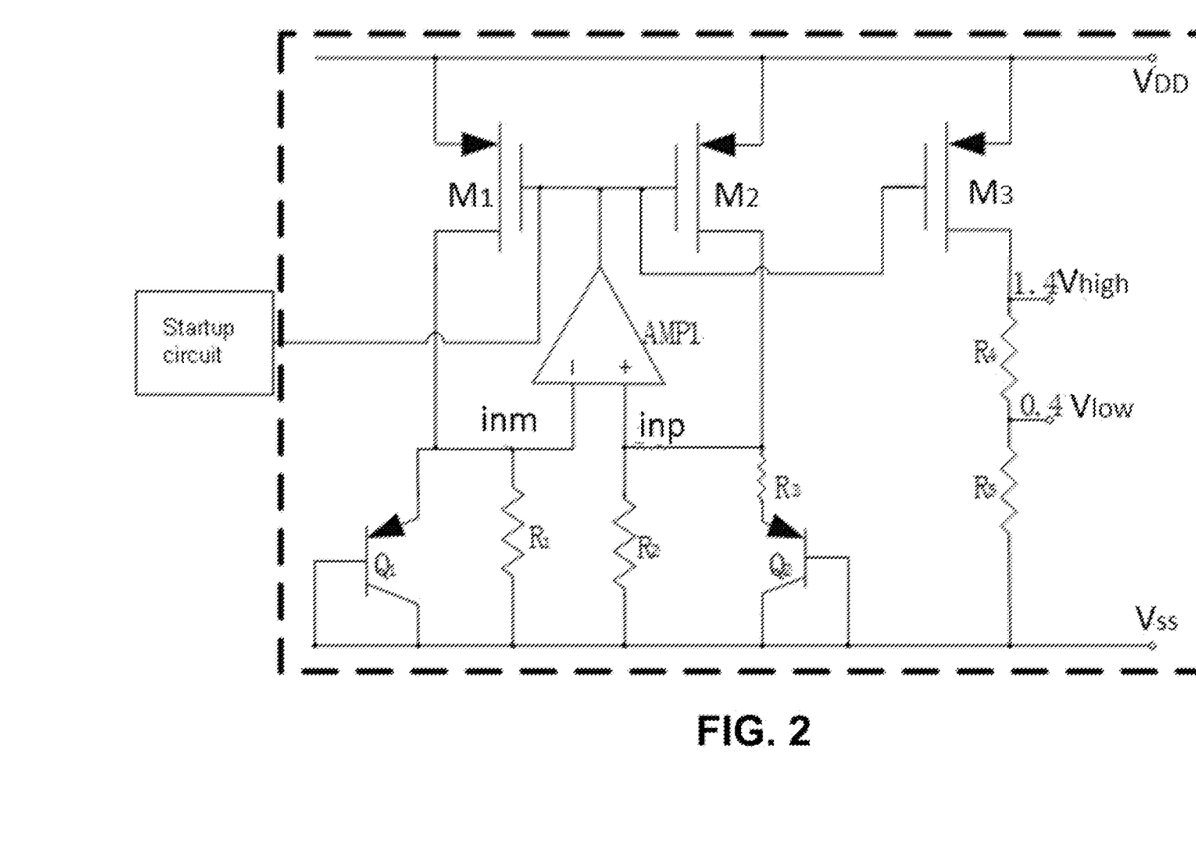
FIG. 2 is a structure diagram of a reference voltage generator circuit according to the present invention.

FIG. 2 is a structure diagram of the reference voltage generator circuit according to the present invention. The reference voltage generator circuit includes a first P-type MOS transistor M1, a second P-type MOS transistor M2 and a third P-type MOS transistor M3, which are connected in parallel.

The sources of the first P-type MOS transistor M1, the second P-type MOS transistor M2 and the third P-type MOS transistor M3 are coupled to the power supply to serve as current sources, respectively, and the gates of the first P-type MOS transistor M1, the second P-type MOS transistor M2 and the third P-type MOS transistor M3 are coupled to the output end of a first amplifier AMP1, respectively. The drain of the first P-type MOS transistor M1 is coupled to the negative input end of the first amplifier AMP1 and the emitter of a first PNP triode Q1. The base of the first PNP triode Q1 is coupled to its collector and grounded. One end of a first resistor R1 is connected to the negative input end of the first amplifier AMP1, and the other end thereof is grounded.

The drain of the second P-type MOS transistor M2 is coupled to the positive input end of the first amplifier AMP1 and to the emitter of a second PNP triode Q2 through a third resistor R3. The base of the second PNP triode Q2 is coupled to its collector and grounded. One end of a second resistor R2 is connected to the positive input end of the first amplifier APM1, and the other end thereof is grounded.

The drain of the third P-type MOS transistor M3 is grounded through a first regulating resistor R4 and a second regulating resistor R5. Under the premise of neglecting the temperature coefficients of the first resistor R1, the second resistor R2 and the third resistor R3, through the deep negative feedback of the first amplifier AMP1, the voltage at a node inm and the voltage at a node inp are made equal to each other, the current generated on the first resistor R1 by $V_{ebQ1}$ has a negative temperature coefficient, and the current generated on the third resistor R3 by the difference between $V_{ebQ1}$ and $V_{ebQ2}$ has a positive temperature coefficient. In this way, current having a zero temperature coefficient is thus generated on the first P-type MOS transistor M1 and the second P-type MOS transistor M by adding together the current having the negative temperature coefficient and the current having the positive temperature coefficient in a certain proportion. By the mirroring of the third P-type MOS transistor M3, this current flows through the first regulating resistor R4 and the second regulating resistor R5 within a narrow temperature range (e.g., 0-50° C.), so that two voltages $V_{high}$ and $V_{low}$ having a zero temperature coefficient are generated. However, due to the temperature change characteristic of a resistor itself in a real chip, the first regulating resistor R4 and the second regulating resistor R5 inevitably have resistance variation related to the temperature value, so that the value of voltage across the first regulating resistor R4 and the second regulating resistor R5 is influenced. To eliminate the influence, on the reference voltage value, of the temperature coefficients of the first regulating resistor R4 and the second regulating resistor R5, by setting the resistance or current values of the first resistor R1, the second resistor R2 and the third resistor R3 or by setting a grain ratio of the first PNP triode Q1 to the second PNP triode Q2, current having a zero temperature coefficient may be allowed to be generated on the first P-type MOS transistor M1 and the second P-type MOS transistor M2. The temperature coefficient of this current is cancelled out by the temperature coefficients of the first regulating resistor R4 and the second regulating resistor R5, so that voltage values having a zero temperature coefficient, i.e., the reference voltage values which do not change with temperature, are obtained on the first regulating resistor R4 and the second regulating resistor R5. During design, the first regulating resistor R4 and the second regulating resistor R5 are set to be resistance adjustable. By tests, the resistance of each chip is properly set in such a way that $V_{high}$ and $V_{low}$ of each chip are equal to each other, that is, the consistency between chips is ensured. This embodiment is described by taking an upper reference voltage value limit of 1.4V and a lower reference voltage value limit of 0.4V as example. Of course, upper and lower reference voltage value limits with a narrower or broader interval may be further selected between 0V and 1.8V. The narrower the interval is, the higher the accuracy is and the smaller the available temperature range is. On the contrary, the larger the interval is, the lower the measurement accuracy is and the larger the available temperature range is.

Figure 3:
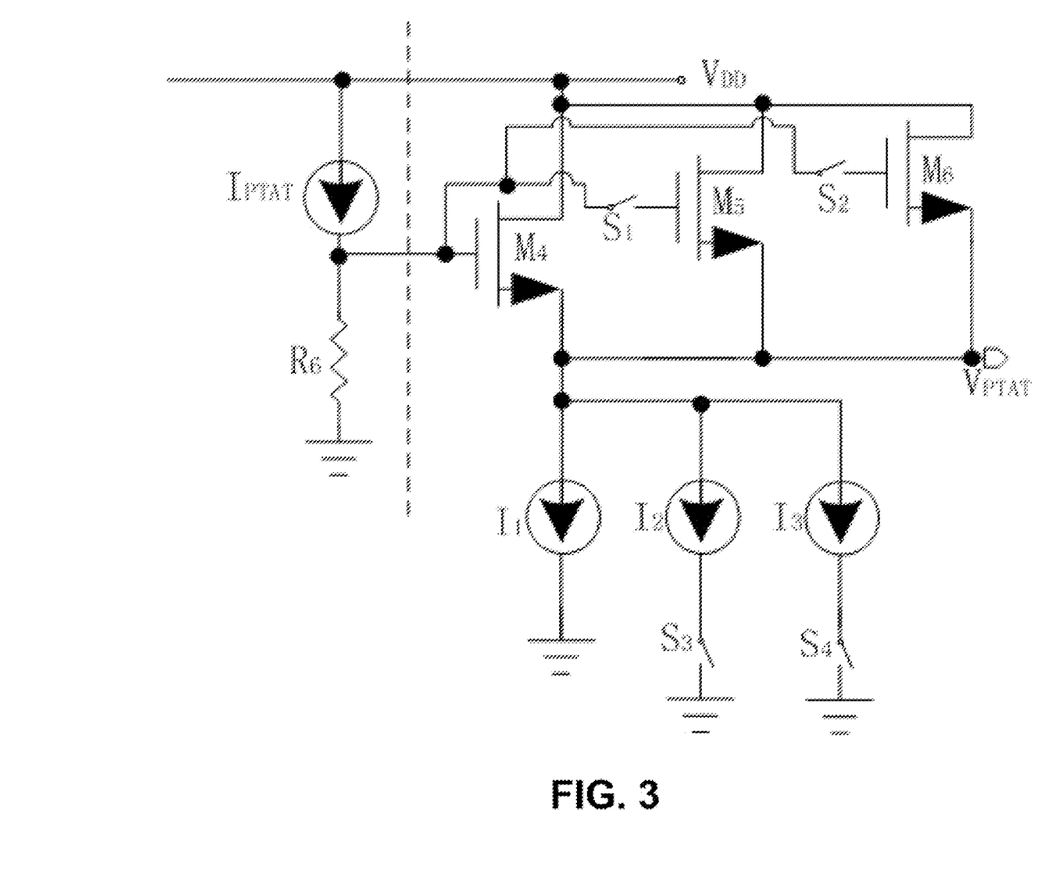
FIG. 3 is a structure diagram of a temperature measurement voltage generator circuit and a calibration circuit according to the present invention.

FIG. 3 is a structure diagram of the temperature measurement voltage generator circuit and the calibration circuit according to the present invention. The temperature measurement voltage generator circuit includes a current source $I_{PTAT}$ in direct proportion to a temperature coefficient and a sixth resistor R6 connected in series to the current source and grounded, and is configured to generate and then output a voltage value signal which linearly changes with temperature to the voltage translation regulator circuit 13.

The voltage translation regulator circuit 13 includes a fourth N-type MOS transistor M4, a fifth N-type MOS transistor M5 and a sixth N-type MOS transistor M6, which are connected in parallel.

The fourth N-type MOS transistor M4, the fifth N-type MOS transistor M5 and the sixth N-type MOS transistor M6 serve as source followers. The drains of the fourth N-type MOS transistor M4, the fifth N-type MOS transistor M5 and the sixth N-type MOS transistor M6 are coupled to the power supply, respectively, and the sources thereof are coupled to a voltage output end $V_{PTAT}$, respectively, to output voltage value signals which linearly change with the temperature coefficient. The gates of the fifth N-type MOS transistor M5 and the sixth N-type MOS transistor M6 are coupled to the gate of the fourth N-type MOS transistor M4 through a first switch S1 and a second switch S2, respectively.

The sources of the fourth N-type MOS transistor M4, the fifth N-type MOS transistor M5 and the sixth N-type MOS transistor M6 are coupled to input ends of a first current source $I_1$, a second current source $I_2$ and a third current source $I_3$, respectively. The output end of the first current source $I_1$ is grounded, and the output ends of the second current source $I_2$ and the third current source $I_3$ are grounded through a third switch S3 and a fourth switch S4, respectively. By setting a ratio of the fourth N-type MOS transistor M4 to the fifth N-type MOS transistor M5 to the sixth N-type MOS transistor M6, a ratio of the first current source $I_1$ to the second current source $I_2$ to the third current source $I_3$, and an ON/OFF state of the first switch S1, the second switch S2, the third switch S3 and the fourth switch S4, the value of total current flowing through the fourth N-type MOS transistor M4, the fifth N-type MOS transistor M5 and the sixth N-type MOS transistor M6 is controlled, so that the purpose of controlling the voltage value of the voltage output end $V_{PTAT}$ is achieved. For example, by setting a width/length ratio of the fourth N-type MOS transistor M4 to the fifth N-type MOS transistor M5 to the sixth N-type MOS transistor M6 as 1:1:2 and by setting an ON/OFF state of the first switch S1 and the second switch S2, four different states having a width/length ratio of 1, 2, 3 and 4 are obtained. Similarly, by setting a ratio of the first current source $I_1$ to the second current source $I_2$ to the third current source $I_3$ as 1:1:2 and by setting an ON/OFF state of the third switch S3 and the fourth switch S4, four different states having a current value of 1, 2, 3 and 4 are obtained. The four states of the N-type MOS transistor and the four states of the current value are combined to control the voltage value of the voltage output end $V_{PTAT}$.

Figure 4:
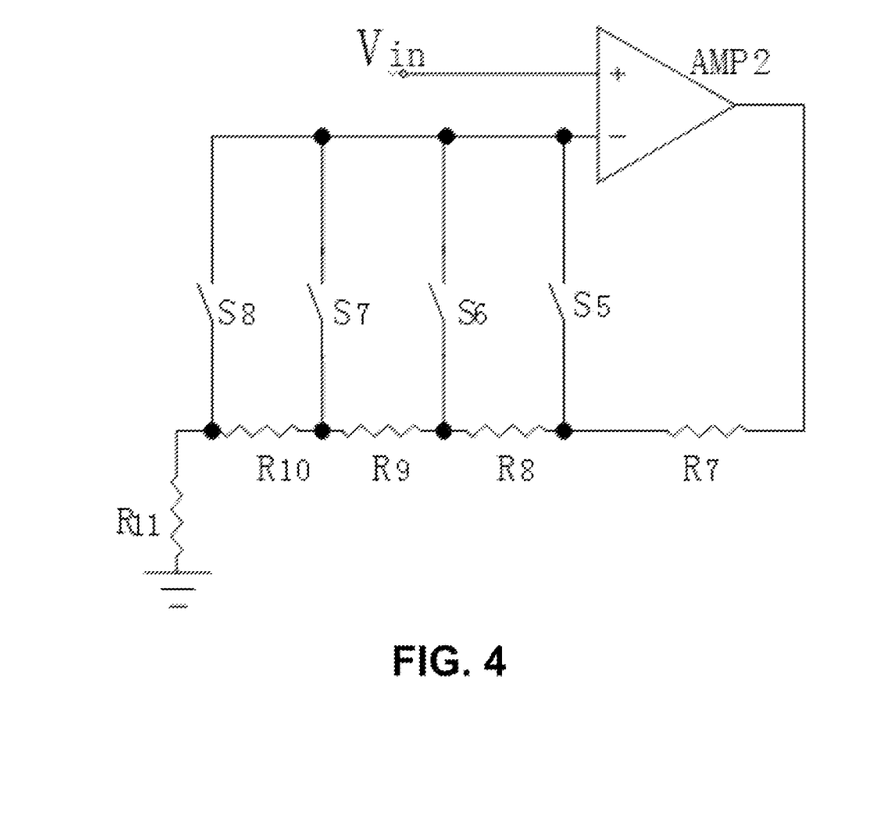
FIG. 4 is a structure diagram of an amplifier circuit according to the present invention.

FIG. 4 is a structure diagram of the amplifier circuit according to the present invention.

Each of the amplifier circuits includes a second amplifier AMP2. The positive input end of the second amplifier AMP2 is connected to the voltage output end of the voltage translation regulator circuit to serve as an amplified signal input pin, the negative input end thereof is grounded through an eighth switch S8 and an eleventh resistor R11, and the output end thereof is in turn connected with a seventh resistor R7, an eighth resistor R8, a ninth resistor R9, a tenth resistor R10 and an eleventh resistor R11 in series and then grounded. One end of each of a fifth switch S5, a sixth switch S6 and a seventh switch S7 is connected to the negative input end of the second amplifier AMP2, and the other end thereof is connected between the seventh resistor R7 and the eighth resistor R8, between the eighth resistor R8 and the ninth resistor R9 and between the ninth resistor R9 and the tenth resistor R10, respectively. Both the first amplifier circuit 14 and the second amplifier circuit 15 are connected like a unity-grain buffer, configured to separately adjust and then output the upper reference voltage value limit and the lower reference voltage value limit to the analog-to-digital converter circuit 17, and meanwhile configured to isolate the reference voltage generator circuit 11 from the analog-to-digital converter circuit 17 and prevent the voltage fluctuation of the analog-to-digital converter circuit 17 from reversely influencing the generation of the reference voltage of the reference voltage generator circuit 11. The third amplifier circuit 16 is connected in such a way that the grain amplification factor is adjustable and configured to amplify the temperature measurement voltage value and adjust this temperature measurement voltage value to be between the upper reference voltage value limit and the lower reference voltage value limit. As both the first amplifier circuit 14 and the second amplifier circuit 15 are connected like a unity-grain buffer, parts of performances thereof, such as loop bandwidth and DC grain, slightly change due to the temperature factor. However, since the two amplifier circuits are connected to form a feedback loop, the temperature and process deviation of the amplifier circuits have no direct influence on the buffer action. That is, if the input is a voltage which does not change with temperature or process deviation, the voltage output by buffering will not change with temperature or process deviation too. In other words, after the two paths of reference voltage values, which are generated by the reference voltage generator circuit 11 and do not change with temperature or process parameters, are amplified by the first amplifier circuit 14 and the second amplifier circuit 15, a constant voltage value which does not change with temperature or process parameters may still be obtained. Similarly, as the grain factor of the third amplifier circuit 16 directly depends upon a ratio of feedback resistances and the temperature coefficients and the process parameters of feedback resistances may be cancelled out by each other, it is possible that the grain factor does not change with temperature or process parameters. Hence, the change of the third amplifier circuit itself due to the temperature or process parameters will not cause the voltage output after amplification to change with temperature or process parameters.

The analog-to-digital converter circuit 17 is configured to convert the upper reference voltage value limit into a digital signal indicative of a maximum value. This embodiment is described by taking a 10-bit binary code as example, and the maximum value in this case is 11 1111 1111. The analog-to-digital converter circuit 17 also converts the lower reference voltage value limit into a 10-bit binary code indicative of a minimum value, i.e., 00 0000 0000, and meanwhile converts the amplified voltage value, which is generated by the temperature measurement voltage generator circuit, into a 10-bit binary code between the upper reference voltage value limit and the lower reference voltage value limit. As the 10-bit binary code indicative of the maximum value and the 10-bit binary code indicative of the minimum value equally divide the respective temperature range into $2^{10}-1$ parts, i.e., 1023 parts, any 10-bit binary code within this interval corresponds to a certain temperature value which is the temperature value of the object measured by using the tag.

Another objective of the embodiments of the present invention is to provide a passive radio frequency identification tag using the temperature measurement and calibration circuit as described above. The passive radio frequency identification tag includes a power supply management portion, an analog circuit portion, a digital circuit portion, a memory portion, a signal transceiver circuit portion and the like. The power supply portion is configured to convert the received electromagnetic field into AC and then convert AC into DC for the operation of the analog circuit portion and the digital circuit portion. The analog circuit portion includes the temperature measurement and calibration circuit as described above, which is configured to detect the temperature of an object to the measured and generate a voltage value which linearly changes with temperature. The digital circuit portion is configured to convert the voltage value signals generated by the analog circuit portion into digital signals and obtain a temperature value of the object to the measured through operational analysis. The memory portion is an erasable memory configured to store all the temperature information for the lookup of users. The signal transceiver circuit portion is configured to perform bidirectional wireless transmission with a reader-writer, for allowing a user to perform operation control and information reading to a tag.

Another objective of the embodiments of the present invention is to provide a method for performing temperature measurement by using the passive radio frequency identification tag as described above. The method includes two parts: calibration prior to measurement and temperature measurement.

The calibration prior to measurement includes the following steps:

a. Generation and calibration of a reference voltage signal

Figure 5:
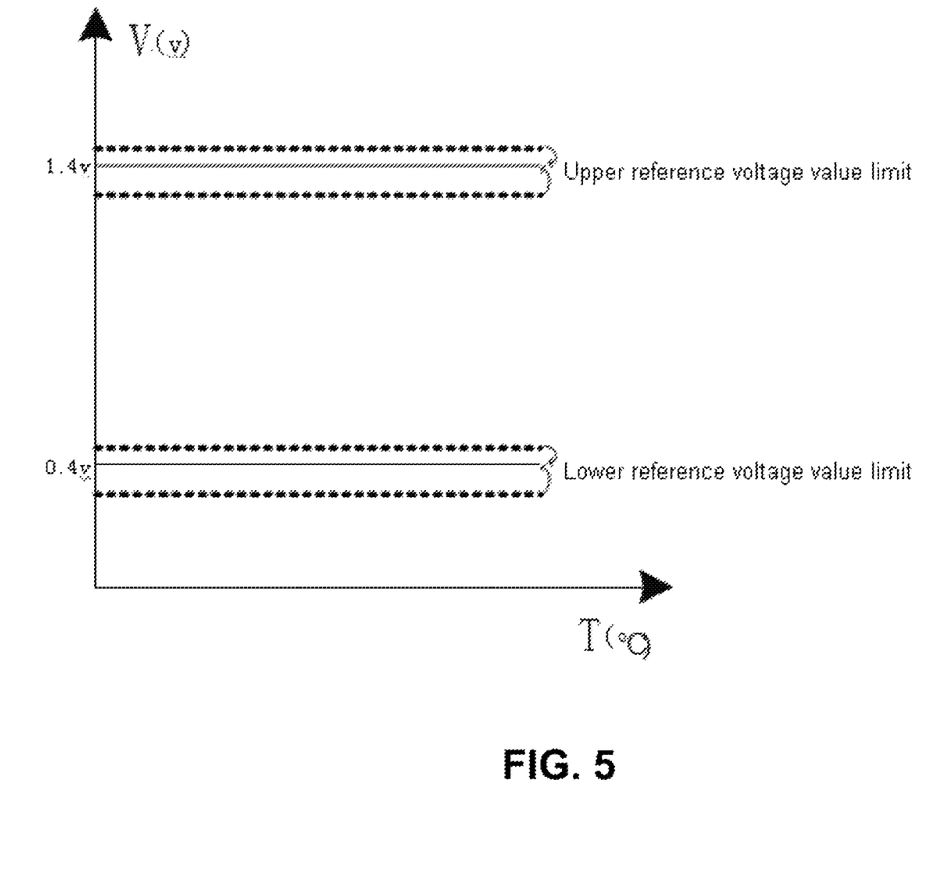
FIG. 5 is a schematic diagram of a step of calibrating an upper reference voltage value limit and a lower reference voltage value limit according to the present invention.

A reference voltage generator circuit of the tag generates an upper reference voltage value limit and a lower reference voltage value limit, which do not change with temperature; and after the upper reference voltage value limit and the lower reference voltage value limit are calibrated, the upper reference voltage value limit of all tags to be measured is calibrated to a uniform upper voltage value limit, and the lower reference voltage value limit thereof is also calibrated to a uniform lower voltage value limit, as shown in FIG. 5, wherein the calibrated reference voltage values have the characteristic of not changing with process parameters of the tags. The pre-calibration step employs circuit calibration, laser trimming calibration or other methods. As the calibration circuit in the circuit calibration method has power supply voltage fluctuation or process deviation, the calibration method employed by the present invention is preferably laser trimming.

b. Generation of digital signals of the upper reference voltage value limit and the lower reference voltage value limit The upper reference voltage value limit is output to an analog-to-digital converter circuit through a first amplifier circuit to generate a digital signal indicative of a maximum value, and the lower reference voltage value limit is output to the analog-to-digital converter circuit through a second amplifier circuit to generate a digital signal indicative of a minimum value. As both the first amplifier circuit and the second amplifier circuit are connected like a unity-grain buffer, parts of performances thereof, such as loop bandwidth and DC grain, slightly change due to the temperature factor. However, since the two amplifier circuits are connected to form a feedback loop, the temperature and process deviation of the amplifier circuits have no direct influence on the buffer action. That is, if the input is a voltage which does not change with temperature or process deviation, the voltage output by buffering will not change with temperature or process deviation too. In other words, after the two paths of reference voltage values, which are generated by the reference voltage generator circuit and do not change with temperature or process parameters, are amplified by the first amplifier circuit and the second amplifier circuit, a constant voltage value which does not change with temperature or process parameters may still be obtained, so that the converted digital signal will not change with temperature or process parameters.

c. Generation and calibration of a calibration temperature voltage value

A temperature measurement voltage generator circuit of the tag generates a calibration voltage value under a uniform calibration temperature; and a voltage translation regulator circuit receives a control signal from an external detection device and then performs translational calibration on the calibration voltage values of all the tags so that the voltage values generated by the tags under the uniform calibration temperature are the same.

The temperature measurement includes the following steps:

d. Generation and amplification of the temperature measurement voltage value

Figure 6:
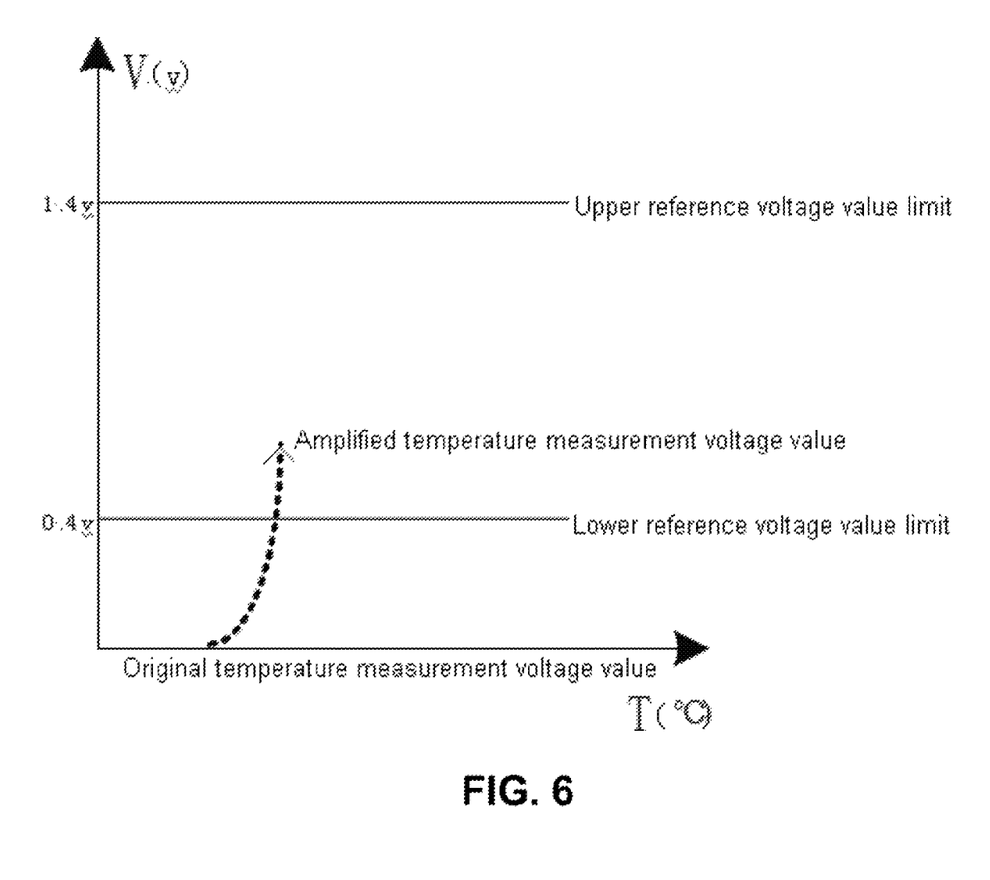
FIG. 6 is a schematic diagram of a step of amplifying a temperature measurement voltage value according to the present invention.

The temperature measurement voltage generator circuit of the tag detects the temperature of an object to be measured (the temperature value of the object to be measured should be within a temperature measurement range of the tag) and generates a voltage value; and the voltage value is amplified by an amplifier circuit to be between the upper reference voltage value limit and the lower reference voltage value limit, as shown in FIG. 6, and input to the analog-to-digital converter circuit. As the grain amplification factor of the third amplifier circuit directly depends upon a ratio of feedback resistances, and the temperature coefficients and process parameters of feedback resistances may be cancelled out by each other, the grain amplification factor does not change with temperature or process parameters. Hence, the change of the third amplifier circuit itself due to the temperature or process parameters will not cause the voltage output after amplification to change with temperature or process parameters. As the amplifier circuit is arranged in such a way that the grain amplification factor is adjustable, the amplification factor of the amplifier may be selected according to the generated voltage value. For example, assumed that the temperature measurement range of the tag is 25° C.-50° C. and the range of the generated voltage value is 4 mv-14 mv, if the amplification factor of the amplifier is 60, the range of the voltage value after amplification is 0.24 v-0.84 v, and this voltage value interval is partially between the upper and lower reference voltage value limits of 0.4 v-1.4 v and there are some values deviated not to be measured. When the amplification factor of the amplifier is 100, the range of the amplified voltage value is 0.4 v-1.4 v, which is completely within the range of the upper and lower reference voltage limits, so that all voltage values measured by using the tag may be subjected to analog-to-digital conversion to obtain accurate temperature values. When the amplification factor of the amplifier is 150, the range of the amplified voltage value is 0.6 v-2.1 v and there are voltage values beyond the range of the upper and lower reference voltage limits, so that those deviated voltage values can not be accurately converted into temperature values. Therefore, the amplification factor of the amplificatory should ensure that the range of the amplified voltage values completely fall into the range of the upper and lower reference voltage value limits, otherwise the voltage values deviating from the range of the upper and lower reference voltage value limits can not be accurately converted into temperature values.

e. Extraction of a temperature value

The analog-to-digital converter circuit converts the voltage value into a digital signal, so that the temperature value of the object to be measured may be obtained according to the digital signal. In the embodiments of the present invention, the upper and lower reference voltage value limits are selected as 0.4 v-1.4 v and the voltage difference of 1 v is converted into a 10-bit binary code, so that the upper voltage value limit is 11 1111 1111 and the lower voltage value limit is 00 0000 0000. That is, the difference in voltage of 1 v is equally divided into $2^{10}-1$ parts, i.e., 1023 parts, where each 10-bit binary code between the upper and lower voltage value limits corresponds to a fixed temperature value. For example, if the tag provided by the present invention is used for measuring a body temperature between 35° C. and 42° C., the accuracy of measurement reaches 7/1023° C.; and if the tag is used for measuring a cold chain temperature between −25° C. and 15° C., the accuracy of measurement reaches 40/1023° C. The tag provided by the present invention has high accuracy of measurement and may be thus widely applied to various accurate temperature detection fields.

We claim:

1. A temperature measurement and calibration circuit, comprising:
a reference voltage generator circuit, an input and output end of which is connected to an external detection device and the output ends of which are connected to a first amplifier circuit and a second amplifier circuit respectively, configured to generate an upper reference voltage value limit to the first amplifier circuit and a lower reference voltage value limit to the second amplifier circuit; wherein the upper reference voltage value limit and the lower reference voltage value limit do not change with temperature or process parameters;
a temperature measurement voltage generator circuit, the output end of which is connected to the external detection device and a voltage translation regulator circuit, configured to generate a voltage value which linearly changes with temperature;
the voltage translation regulator circuit, the input end of which is connected to the external detection device and the temperature measurement voltage generator circuit, configured to translate and then output the temperature measurement value upon receiving a voltage translation regulation indication signal input from the external detection device;
three amplifier circuits, wherein both the first amplifier circuit and the second amplifier circuit are connected like a unity-grain buffer and configured to separately adjust and then output the upper reference voltage value limit and the lower reference voltage value limit to an analog-to-digital converter circuit; and the third amplifier circuit is connected in such a way that the grain amplification factor is adjustable and configured to amplify the temperature measurement voltage value output by the voltage translation regulator circuit, adjust this temperature measurement voltage value to be between the upper reference voltage value limit and the lower reference voltage value limit, and output this temperature measurement voltage value to the analog-to-digital converter circuit; and
the analog-to-digital converter circuit, configured to convert the upper reference voltage value limit and the lower reference voltage value limit into digital signals and convert the temperature measurement voltage value, which is output by the third amplifier circuit and between the upper reference voltage value limit and the lower reference voltage value limit, into a digital signal, wherein the digital signal is indicative of the temperature.

2. The temperature measurement and calibration circuit according to claim 1, further comprising a voltage-stabilizing filter circuit connected between a power supply and a GND.

3. The temperature measurement and calibration circuit according to claim 1, characterized in that the reference voltage generator circuit comprises a first P-type MOS transistor, a second P-type MOS transistor and a third P-type MOS transistor, which are connected in parallel;
the sources of the first P-type MOS transistor, the second P-type MOS transistor and the third P-type MOS transistor are coupled to the power supply to serve as current sources, respectively, and the gates thereof are coupled to the output end of a first amplifier, respectively; the drain of the first P-type MOS transistor is coupled to the negative input end of the first amplifier and the emitter of a first PNP triode; the base of the first PNP triode is coupled to its collector and grounded; and one end of a first resistor is connected to the negative input end of the first amplifier, and the other end thereof is grounded;
the drain of the second P-type MOS transistor is coupled to the positive input end of the first amplifier and to the emitter of a second PNP triode through a third resistor; the base of the second PNP triode is coupled to its collector and grounded; and one end of a second resistor is connected to the positive input end of the first amplifier, and the other end thereof is grounded; and the drain of the third P-type MOS transistor is grounded through a first regulating resistor and a second regulating resistor.

4. The temperature measurement and calibration circuit according to claim 1, characterized in that the temperature measurement voltage generator circuit comprises a current source in direct proportion to a temperature coefficient, and a sixth resistor, which is connected in series to the current source and grounded, configured to generate and then output a voltage value signal which linearly changes with temperature to the voltage translation regulator circuit.

5. The temperature measurement and calibration circuit according to claim 1, characterized in that the voltage translation regulator circuit comprises a fourth N-type MOS transistor, a fifth N-type MOS transistor and a sixth N-type MOS transistor, which are connected in parallel;
the fourth N-type MOS transistor, the fifth N-type MOS transistor and the sixth N-type MOS transistor serve as source followers; the drains of the fourth N-type MOS transistor, the fifth N-type MOS transistor and the sixth N-type MOS transistor are coupled to the power supply, respectively, and the sources thereof are coupled to a voltage output end, respectively, to output voltage value signals which linearly change with the temperature coefficient; and the gates of the fifth N-type MOS transistor and the sixth N-type MOS transistor are coupled to the gate of the fourth N-type MOS transistor through a first switch and a second switch, respectively; and
the sources of the fourth N-type MOS transistor, the fifth N-type MOS transistor and the sixth N-type MOS transistor are coupled to input ends of a first current source, a second current source and a third current source, respectively; the output end of the first current source is grounded; and the output ends of the second current source and the third current source are grounded through a third switch and a fourth switch, respectively.

6. The temperature measurement and calibration circuit according to claim 1, characterized in that each of the amplifier circuits comprises a second amplifier, the positive input end of the second amplifier being connected to the voltage translation regulator circuit to serve as an amplified signal input pin, the negative input end of the second amplifier being grounded through an eighth switch and an eleventh resistor, the output end of the second amplifier being in turn connected with a seventh resistor, an eighth resistor, a ninth resistor, a tenth resistor and an eleventh resistor in series and then grounded; and one end of each of a fifth switch, a sixth switch and seventh switch is connected to the negative input end of the second amplifier, and the other end thereof is connected between the seventh resistor and the eighth resistor, between the eighth resistor and the ninth resistor and between the ninth resistor and the tenth resistor, respectively.

7. A passive radio frequency identification tag, comprising the temperature measurement and calibration circuit according to claim 1.

8. A method for performing temperature measurement by using the passive radio frequency identification tag according to claim 7, characterized in that the method comprises two parts: calibration prior to measurement and temperature measurement;

the calibration prior to measurement comprises the following steps:

a. generation and calibration of a reference voltage signal a reference voltage generator circuit of the tag generates an upper reference voltage value limit and a lower reference voltage value limit, which do not change with temperature; and after the upper reference voltage value limit and the lower reference voltage value limit are calibrated, the upper reference voltage value limit of all tags to be measured is calibrated to a uniform upper voltage value limit, and the lower reference voltage value limit thereof is also calibrated to a uniform lower voltage value limit, wherein the upper reference voltage value limit and the lower reference voltage value limit have the characteristic of not changing with temperature or process parameters;

b. generation of digital signals of the upper reference voltage value limit and the lower reference voltage value limit the upper reference voltage value limit is output to an analog-to-digital converter circuit through a first amplifier circuit to generate a digital signal indicative of a maximum value, and the lower reference voltage value limit is output to the analog-to-digital converter circuit through a second amplifier circuit to generate a digital signal indicative of a minimum value;

c. generation and calibration of a calibration temperature voltage value a temperature measurement voltage generator circuit of the tag generates a calibration voltage value under a uniform calibration temperature; and a voltage translation regulator circuit receives a control signal from an external detection device and then performs translational calibration on the calibration voltage values of all the tags so that the voltage values generated by the tags under the uniform calibration temperature are the same; and the temperature measurement comprises the following steps:

d. generation and amplification of the temperature measurement voltage value the temperature measurement voltage generator circuit of the tag detects the temperature of an object to be measured and generates a voltage value; and the voltage value is amplified by an amplifier circuit to be between the upper reference voltage value limit and the lower reference voltage value limit and input to the analog-to-digital converter circuit;

e. extraction of a temperature value the analog-to-digital converter circuit converts the voltage value into a digital signal, so that the temperature value of the object to be measured may be obtained according to the digital signal.

9. The method for performing temperature measurement by using the passive radio frequency identification tag according to claim 8, characterized in that the method for calibrating the upper reference voltage value limit and the lower reference voltage value limit is laser trimming.

\* \* \* \* \*